United States Patent
Huang

(10) Patent No.: US 6,318,763 B1
(45) Date of Patent: Nov. 20, 2001

(54) HIGH-PRESSURE FLUID HOSE CONNECTOR

(76) Inventor: Hung-Yueh Huang, No. 19, Chi-Shih St., South Dist., Taichung (TW)

( * ) Notice: Subject to any disclaimer, the term of this patent is extended or adjusted under 35 U.S.C. 154(b) by 0 days.

(21) Appl. No.: 09/457,288

(22) Filed: Dec. 9, 1999

(30) Foreign Application Priority Data

Jan. 13, 1999 (TW) .................................................. 88200495

(51) Int. Cl.⁷ .................................................. F16L 33/00
(52) U.S. Cl. .................................................. 285/256
(58) Field of Search .................................................. 285/256, 381

(56) References Cited

U.S. PATENT DOCUMENTS

| | | | |
|---|---|---|---|
| 2,525,616 | * | 10/1950 | Peeps .................................. 285/256 X |
| 3,140,106 | * | 7/1964 | Thomas et al. .................... 285/256 X |
| 3,549,180 | * | 12/1970 | MacWilliam ........................ 285/256 |
| 3,726,547 | * | 4/1973 | Cox, Jr. .............................. 285/256 X |
| 3,951,438 | * | 4/1976 | Scales ................................. 285/256 X |
| 3,999,781 | * | 12/1976 | Todd ................................... 285/256 X |
| 4,544,187 | * | 10/1985 | Smith .................................. 285/256 |
| 4,905,766 | * | 3/1990 | Dietz et al. ........................ 285/382.4 X |
| 5,105,854 | * | 4/1992 | Cole et al. .......................... 285/256 X |

FOREIGN PATENT DOCUMENTS

2221792 * 9/1990 (JP) .................................. 285/256 X

* cited by examiner

Primary Examiner—Lynne H. Browne
Assistant Examiner—David E. Bochna
(74) Attorney, Agent, or Firm—Rosenberg, Klein & Lee

(57) ABSTRACT

A high-pressure fluid hose connector capable of preventing scraping a hose during installation, has a connecting pipe having multiple teeth around the middle portion thereof and a locking sleeve having multiple notches defined thereon and corresponding to the teeth of the connecting pipe.

1 Claim, 5 Drawing Sheets

HIGH-PRESSURE FLUID HOSE CONNECTOR

BACKGROUND OF THE INVENTION

1. Field of the Invention

The present invention relates to a high-pressure fluid hose connector, more particularly to a high-pressure fluid hose connector capable of not scraping the hose during installation.

2. Description of Related Art

With reference to FIG. 5, a conventional high-pressure fluid hose connector comprises a upper sleeve (45) for connection to a union (21), a connecting pipe (40) co-axially fit in the upper sleeve (45) and a lower sleeve (43) co-axially fit on the connecting pipe (40). The connecting pipe (40) has a locking flange (44) integrally defined on the upper portion, a locking sleeve (41) integrally defined on the middle portion thereof and multiple gripping flanges (42) integrally protruding from the lower portion. The locking flange (44) is locked in the lower portion of the upper sleeve (45) when the connecting pipe (40) is fit on the upper sleeve (45). The lower sleeve (43) has multiple gripping flanges (430) integrally protrude from the inner wall thereof and a locking edge (48) on the upper portion thereof. A locking gap will be formed between the gripping flanges (42) of the connecting pipe (40) and the gripping flanges (430) of the lower sleeve (43) when the lower sleeve (43) is fit on the connecting pipe (40).

When installed, the lower portion of the connecting pipe (40) is inserted into the lower sleeve (43), and the locking edge (48) of the lower sleeve (43) is pressed toward the connecting pipe (40) to lock the connecting pipe (40). Then, a hose (20) is inserted into the opening of the locking gap between the lower sleeve (43) and the gripping flanges (42) of the connecting pipe (40). Subsequently, the hose (20) is forced toward the upper portion of the connecting pipe (40) and a tool such as a hydraulic press is used to press the lower sleeve (43) toward the flanges (42) so that the hose (20) can be fixedly locked between the lower sleeve (43) and the connecting pipe (40). Afterward, the upper sleeve (45) is rotated to connect with the union (21) while the locking sleeve (41) is locked by a tool such as a wrench (30). With the conventional high-pressure fluid hose connector shown in FIG. 5, the relative rotation of the connecting pipe (40) to the lower sleeve (43) can be prevented during installation. Therefore, the hose (20) is prevented from being scraped by the gripping flanges (42) of the connecting pipe (40) or by the gripping flanges (430) of the lower sleeve (43).

Since the locking sleeve (41) is integral with the connecting pipe (40), a work-piece having an outer diameter larger than that of the locking sleeve (41) is needed so that the work-piece can be made into the form of the connecting pipe (40). A problem in wasting the material of a work-piece for manufacturing the connecting pipe (40) occurs. Additionally, a special tool is needed to press the lower portion of the locking flange (44) to lock the upper sleeve (45), and thus difficulty in pressing the lower portion of the upper sleeve (45) to lock the locking flange (44) occurs.

With reference to FIG. 6, a conventional high-pressure fluid hose connector is suggested to avoid the above-mentioned problem and difficulty. The conventional connector in FIG. 6 is similar to that in FIG. 5 except that the locking sleeve (54) is a separate piece instead of being integrally extended from the connecting pipe (50). With the conventional connector in FIG. 6, the locking flange (51) can be easily put into the upper sleeve (52) by inserting the lower portion of the connecting pipe (50) through the upper sleeve (52) during installation. Then, the locking sleeve (54) and the lower sleeve (55) can be co-axially fit on the connecting pipe (50) and a press is applied on the locking edge (58) to lock the upper portion of the lower sleeve (55) into the lower portion of the locking sleeve (54). Afterward, the hose (20) is put into the gap between the connecting pipe (50) and the lower sleeve (55), and then a hydraulic press is used to press the lower sleeve (55) toward the connecting pipe (50) to lock the hose (20) between the gripping flanges (53) and (550). Subsequently, the upper sleeve (52) is connected to the union (21) while the locking sleeve (54) is locked by a tool such as a wrench (30).

However, relative rotation of the connecting pipe (50) to the locking sleeve (54) occurs due to the weak lock between the locking sleeve (54) and the connecting pipe (50) when the upper sleeve (52) is screwed onto the union (21). A problem of scraping the hose (20) occurs.

Another conventional connector suggested to avoid the rotation of the connecting pipe during installed is shown in FIG. 7. With reference to FIG. 7, the high-pressure fluid hose connector comprises a connecting pipe (60), an upper sleeve (66) co-axially fit on the upper portion of the connecting pipe (60), and a lower sleeve (70) co-axially fit on the lower portion of the connecting pipe (60). The connecting pipe (60) has multiple facets (62) defined on the surface of the middle portion. The multiple facets (62) are configured to form a polygonal outer periphery on the connecting pipe (60). The lower sleeve (70) has a locking sleeve (69) integrally defined on the upper portion. The inner periphery of the locking sleeve (69) is composed of multiple facets (68) configured into a polygon symmetric with the polygonal outer periphery of the middle portion of the connecting pipe (60). During installation, the relative rotation of the connecting pipe (60) can be avoided by locking the connecting pipe (60) facets (62) with the locking sleeve (69) facets (68). However, such a locking relationship between facets (62) and (68) is not so strong to fixedly locking the rotation of the connecting pipe (60) due to difficulty in aligning the connecting pipe (60) facets (62) to the locking sleeve (69) facets (68) one by one during installation. Therefore, the capacity to avoid scraping the hose by the conventional connector in FIG. 7 is so limited that it is not manufactured any longer. In addition, when forming the polygonal facets (62), much material should be cut out of the outer wall of the connecting pipe (60). Since the wall of the connecting pipe (60) is very thin, to form the polygonal facets (62) by cutting out the material thereof will greatly reduce the intensity of the wall of the connecting pipe (60). Thus a problem in breaking the connecting pipe (60) is further found in the connector of FIG. 7.

In view of the above, there is need for a high-pressure fluid hose connector which is capable of preventing scraping the hose during installation while being easily installed on a union and saving material during manufacturing.

SUMMARY OF THE INVENTION

The objective of the present invention is to provide a high-pressure fluid hose connector, which is capable of preventing scraping the hose during installation while being easily installed on a union and saving material during manufacturing.

To achieve the objective, the high-pressure fluid hose connector in accordance with the present invention comprises a connecting pipe having multiple teeth around the middle portion and a locking sleeve having multiple notches defined thereon and corresponding to the teeth of the connecting pipe.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
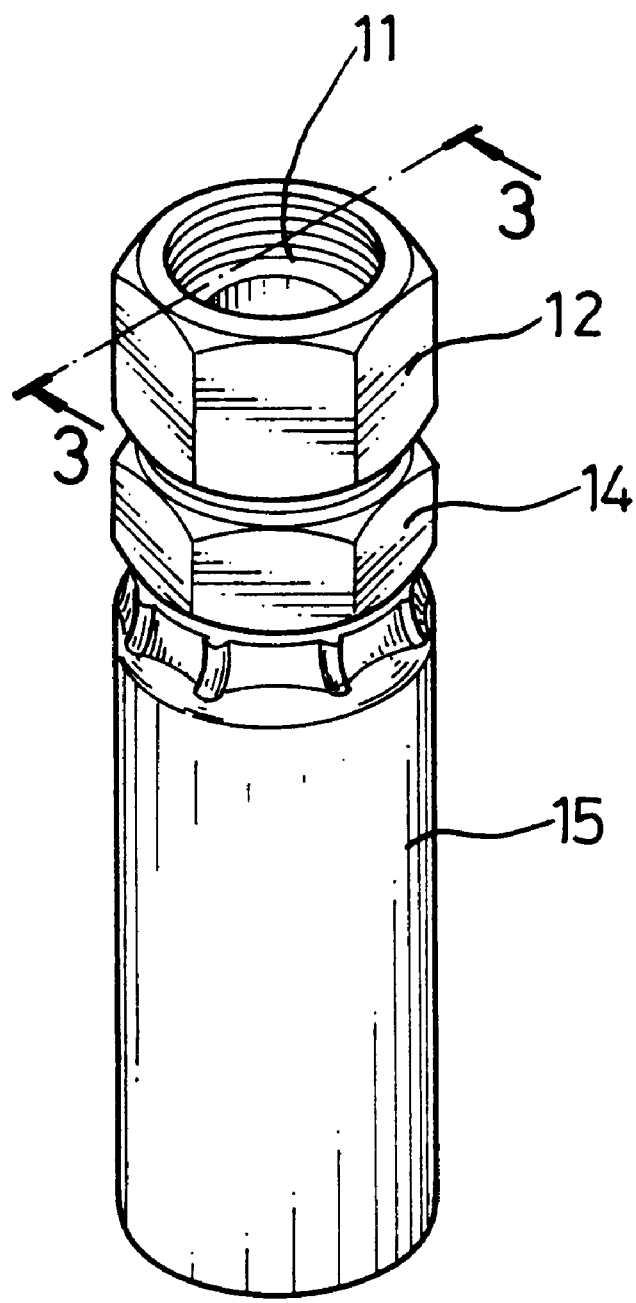
FIG. 1 is a perspective view of the high-pressure fluid hose connector in accordance with the present invention.
Figure 2:
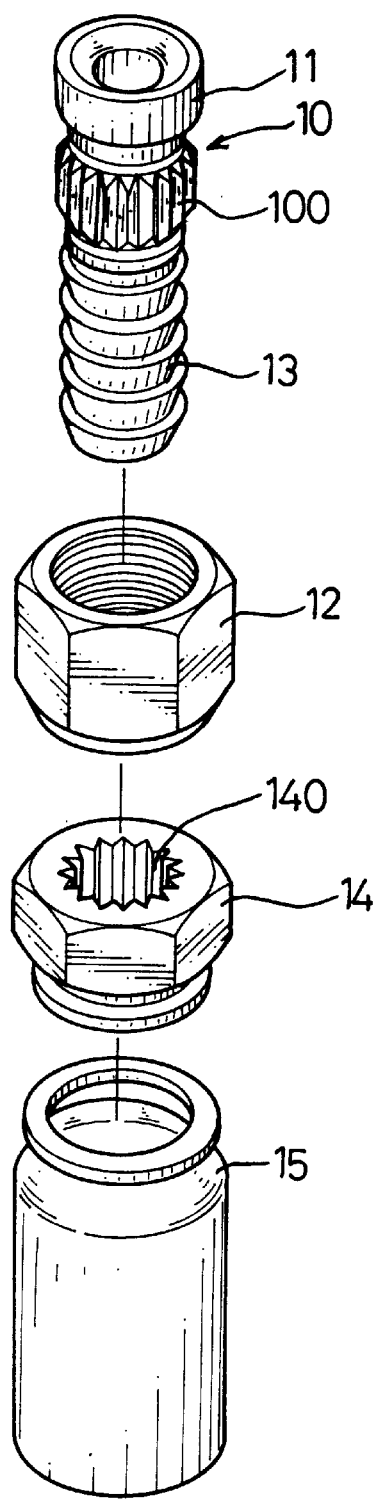
FIG. 2 is an exploded perspective view of the high-pressure fluid hose connector of FIG. 1.
Figure 3:
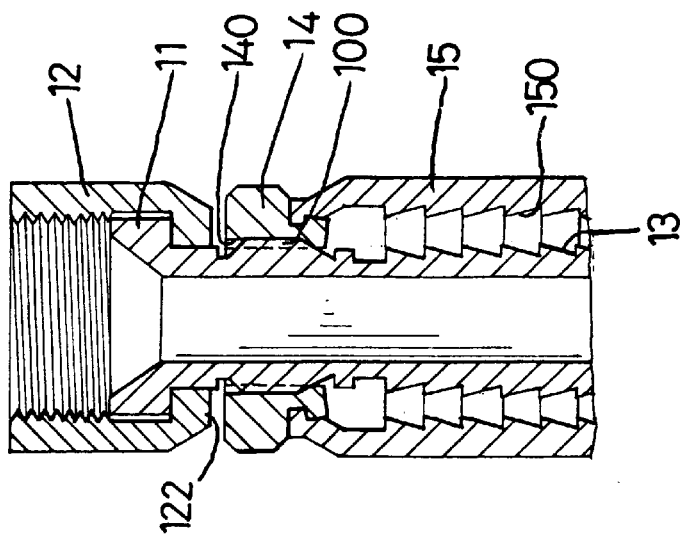
FIG. 3 is a side plain cross sectional view of the high-pressure fluid hose connector along line 3—3 of FIG. 1.

Referring to FIGS. 1, 2 and 3, the high-pressure fluid hose connector capable of preventing scraping the hose when installed in accordance with the present invention comprises a connecting pipe (10), an upper sleeve (12), a locking sleeve (14) and a lower sleeve (15).

The connecting pipe (10) has an annular shoulder (11) defined on the upper portion capable of fitting into the lower portion of the upper sleeve (12). The middle portion of the connecting pipe (10) has multiple teeth (100) integrally extending from the outer periphery. The lower portion of the connecting pipe (10) has multiple gripping flanges (13) integrally extending from the outer periphery.

The upper sleeve (12) has a lower portion with a flange (122) extending therefrom.

The locking sleeve (14) has multiple notches (140) defined on the inner periphery and symmetric to the connecting pipe (10) teeth (100) so that the connecting pipe (10) teeth (100) can be locked by the locking sleeve (14) notches (140) to prevent rotation of the connecting pipe (10) during installation. The locking sleeve (14) has a polygonal outer periphery to facilitate holding the locking sleeve (14) and connecting pipe (10) with tools.

The lower sleeve (15) has multiple gripping flanges (150) defined on the inner periphery corresponding to the connecting pipe (10) gripping flanges (13).

Figure 4:
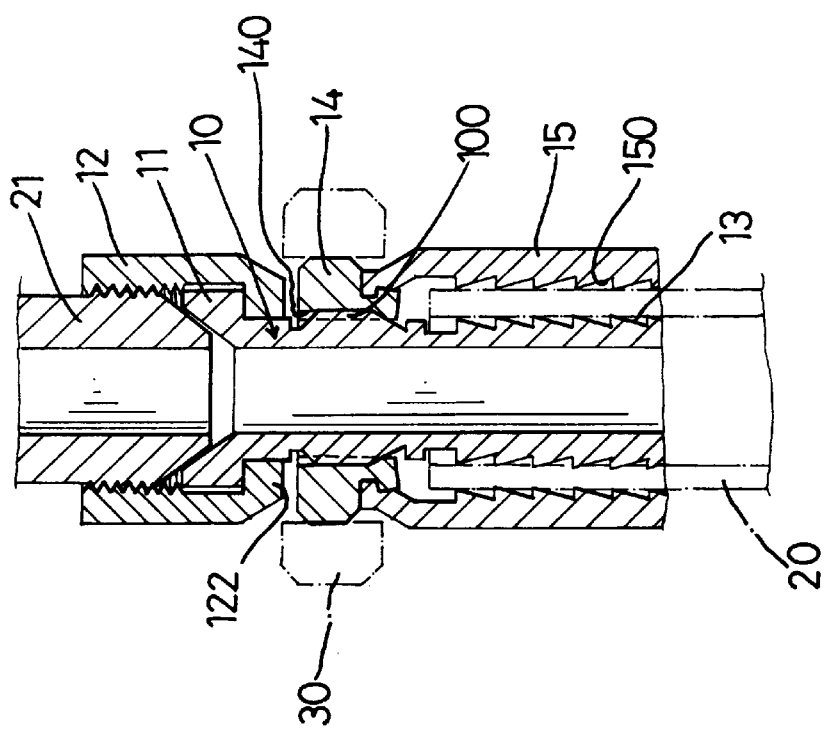
FIG. 4 is a side plain cross sectional view of the high-pressure fluid hose connector in FIG. 1 when installed on a union.
Figure 5:
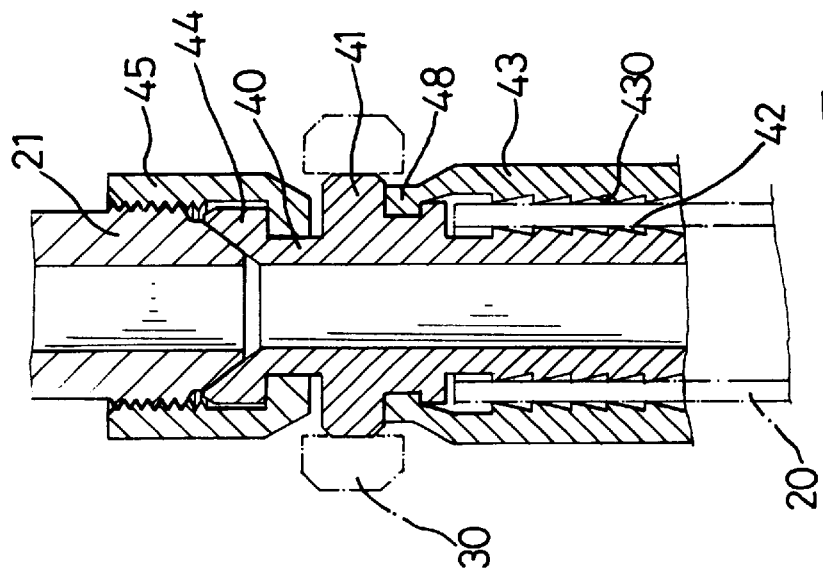
FIG. 5 is a side plain cross sectional view of a high-pressure fluid hose connector in accordance with a prior art installed on a union.
Figure 6:
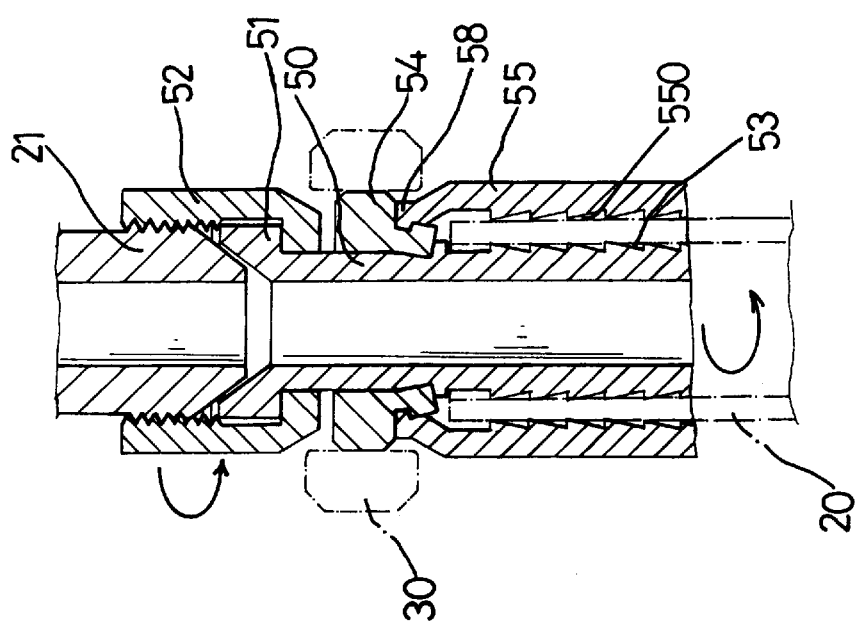
FIG. 6 is a side plain cross sectional view of the another high-pressure fluid hose connector in accordance with a prior art installed on a union.
Figure 7:
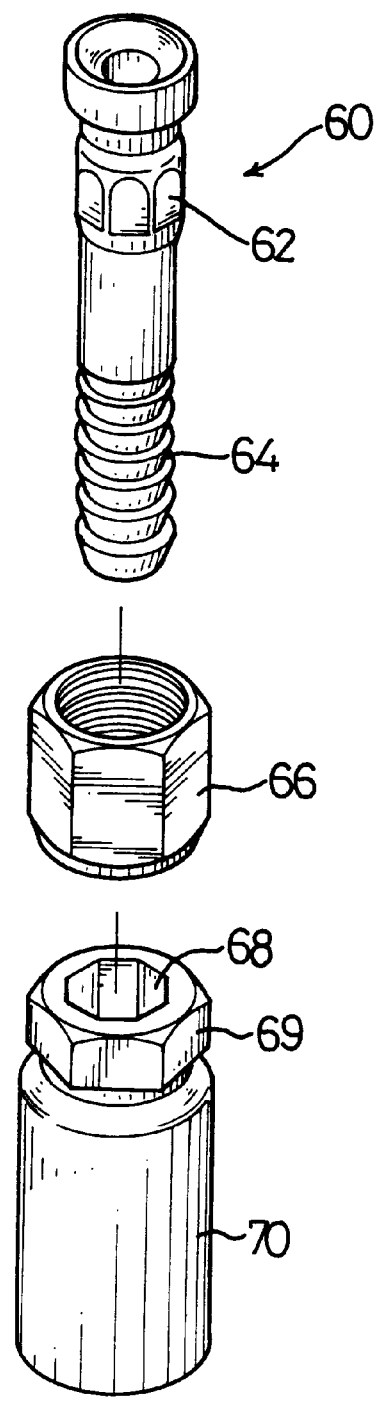
FIG. 7 is an exploded perspective view of another high-pressure fluid hose connector in accordance with a prior art.

With reference to FIGS. 3 and 4, during installation, the connecting pipe (10) annular shoulder (11) is fit into the flange (122) on the lower portion of the upper sleeve (12) by inserting the lower portion of the connecting pipe (10) through the top of the upper sleeve (12). Thus, no special tool is needed to fit the connecting pipe (10) annular shoulder (11) into the lower portion of the upper sleeve (12). Subsequently, the locking sleeve (14) and the lower sleeve (15) are fit on the connecting pipe (10) by inserting the lower portion of the connecting pipe (10) through the locking sleeve (14) and into the lower sleeve (15) and also locking the lower sleeve (15) onto the locking sleeve (14). A gap is formed between the gripping flanges (13) and (150) when the lower sleeve (15) is co-axially fit on the connecting pipe (10). A hose (20) then is put into the gap between the connecting pipe (10) and the lower sleeve (15) and is pushed toward the upper portion of the connecting pipe (10) and then the lower sleeve (15) is pressed toward the connecting pipe (10) by a hydraulic press to fixedly grip the hose (20) between the lower sleeve (15) and the connecting pipe (10). After assembling the high-pressure fluid hose connector with a hose (20), the connector is connected to a union (21) by screwing the upper sleeve (12) onto the union (21) while a tool such as a wrench (30) is used to keep the locking sleeve (14) from rotating. Since the teeth (100) are locked together with the notches (140), rotation of the connecting pipe (10) relative to the lower sleeve (15) is avoided. Thus, the hose (20) is prevented from being scraped by the gripping flanges (13), (150) during installation of the connector with the union (21).

Additionally, since the locking sleeve (14) is not integral with the connecting pipe (10), the work piece for manufacturing the connecting pipe (10) need not have an outer diameter at least the same as that of the locking sleeve (14) thereby saving material during manufacturing.

Although the present invention has been explained in relation to its preferred embodiment, it is to be understood that many other possible modifications and variations can be made without departing from the spirit and scope of the invention as hereinafter claimed.

What is claimed is:

1. A high-pressure fluid hose connector, comprising:

a longitudinally extended connecting pipe with an upper portion having an annular shoulder formed thereon, a middle portion having a plurality of longitudinally extended teeth defined on an outer periphery thereof in angularly spaced relationship, and a lower portion having multiple gripping flanges on the outer periphery thereof;

an upper sleeve co-axially fit on the connecting pipe, said upper sleeve having a lower portion with a flange extending therefrom to engage the annular shoulder of the connecting pipe when fit on the connecting pipe, the upper sleeve being adapted to connect to a union;

a locking sleeve co-axially fit on the connecting pipe, the locking sleeve having a plurality longitudinally extended notches formed on an inner periphery thereof in correspondence with the plurality of teeth of the connecting pipe, and having a lower portion defined thereon;

a lower sleeve co-axially fit on the connecting pipe, the lower sleeve having multiple gripping flanges formed on an inner periphery thereof and an upper portion adapted for locking on the lower portion of the locking sleeve; and, a gap formed between the gripping flanges of the upper sleeve and the lower sleeve to securely receive a hose therein;

wherein the plurality of teeth are respectively locked together with the plurality of notches to prevent rotation of the connecting pipe relative to the lower sleeve so that the hose is prevented from being scraped by the gripping flanges during installation of the connector with a union.

* * * * *